United States Patent [19]

Yamamoto et al.

[11] Patent Number: 4,533,514
[45] Date of Patent: Aug. 6, 1985

[54] NUCLEAR REACTOR DEGASSING METHOD AND DEGASSING SYSTEM

[75] Inventors: Michiyoshi Yamamoto; Katsumi Ohsumi; Shinji Mitani; Yoshie Takashima; Hiroo Igarashi, all of Hitachi, Japan

[73] Assignees: Hitachi, Ltd.; Hitachi Engineering Co., Ltd., both of Tokyo, Japan

[21] Appl. No.: 311,886

[22] Filed: Oct. 15, 1981

[30] Foreign Application Priority Data

Oct. 17, 1980 [JP] Japan .................... 55-144329

[51] Int. Cl.³ ............................................ G21C 19/32
[52] U.S. Cl. .................................. 376/308; 376/310; 376/314
[58] Field of Search ............... 376/282, 298, 299, 306, 376/308, 314, 310

[56] References Cited

U.S. PATENT DOCUMENTS

| 3,663,725 | 5/1972 | Pearl | 376/306 |
|---|---|---|---|
| 3,865,688 | 2/1975 | Kleimola | 376/306 |
| 3,910,817 | 10/1975 | Frumerman et al. | 376/300 |
| 3,932,212 | 1/1976 | Gross et al. | 376/308 |
| 4,032,396 | 6/1977 | Braun | 376/282 |
| 4,064,002 | 12/1977 | Desmarchais et al. | 376/282 |
| 4,210,614 | 7/1980 | Kleimola | 376/306 |
| 4,293,382 | 10/1981 | Ohsumi et al. | 376/308 |
| 4,322,267 | 3/1982 | Kinoshita et al. | 376/299 |

Primary Examiner—Sal Cangialosi
Attorney, Agent, or Firm—Antonelli, Terry & Wands

[57] ABSTRACT

Control rods are inserted into the core of a nuclear reactor in operation to shut down the reactor output. Before completion of entire control rod insertion, a high-temperature coolant flowing in piping for a reactor water clean-up system is sprayed into the space in the upper portion of the reactor vessel. As the space is under negative pressure, oxygen existing in the water droplets of the sprayed coolant is separated. After completion of entire control rod insertion, a residual heat removal system is operated. The spraying operation is discontinued and a low-temperature coolant cooled by a heat exchanger in the residual heat removal system is sprayed into said space. The coolant sprayed by said first spraying operation is not cooled by the heat exchanger in said residual heat removal system.

16 Claims, 9 Drawing Figures

NUCLEAR REACTOR DEGASSING METHOD AND DEGASSING SYSTEM

This invention relates to a nuclear reactor degassing method and a degassing system therefor, and more particularly it relates to a degassing method and degassing system which can be advantageously adapted in nuclear reactors for lowering the dissolved oxygen concentration in the coolant in the reactor vessel.

It is known that, in the water cooling type nuclear reactors, particularly in the boiling water type ones, the concentration of the oxidizing material such as dissolved oxygen in the coolant is a highly influential factor for the corrosion of feed water piping. In order to suppress the corrosion on feed water piping, it has been proposed to adjust the dissolved oxygen concentration in the coolant flowing in the piping (U.S. Pat. No. 3,663,725).

Also, a nuclear reactor degassing method in which dissolved oxygen in the coolant in the nuclear reactor pressure vessel is removed at the time of start-up of the reactor to mitigate the risk of stress corrosion cracking of the pressure vessel and the structures therein was proposed in Japanese Laid-Open Patent Application No. 39791/79 (U.S. Pat. No. 4,293,382).

An object of this invention is to decrease the dissolved oxygen concentration in the coolant in the nuclear reactor vessel during the reactor start-up period.

Another object of this invention is to decrease the dissolved oxygen concentration in the coolant in the nuclear reactor vessel at the time of shutdown of the reactor.

A salient feature of this invention resides in that the coolant in the nuclear reactor vessel is sprayed while in a highly heated state into the space in the vessel and the gas in the space is extracted from the nuclear reactor vessel.

This invention has been achieved as a result of investigation of the characteristic peculiarities at the time of start-up and shutdown of the boiling water-type nuclear reactors.

First, the situation at the time of shutdown of a boiling water type nuclear reactor is discussed.

During the normal operation of a boiling water-type nuclear reactor, the steam generated in the nuclear reactor pressure vessel is fed into a turbine by way of main steam piping. The inside pressure of the vessel during normal operation is around 70 kg/cm$^2$ and the coolant temperature in the vessel is about 280° C. When the reactor operation is discontinued, all of the control rods are first inserted into the core to stop nuclear fission and then the main steam valve in the main steam piping is closed to release the steam into a condenser through by-pass piping, reducing the pressure in the reactor pressure vessel. When the inside pressure of the vessel drops below 10 kg/cm$^2$, steam release from by-pass piping is stopped and the coolant in the vessel is cooled by a residual heat removal system. This causes corresponding reduction of the inside pressure of the vessel. At the time of shutdown of the reactor, the pressure vessel is in communication with the condenser which is under negative pressure.

Figure 1:
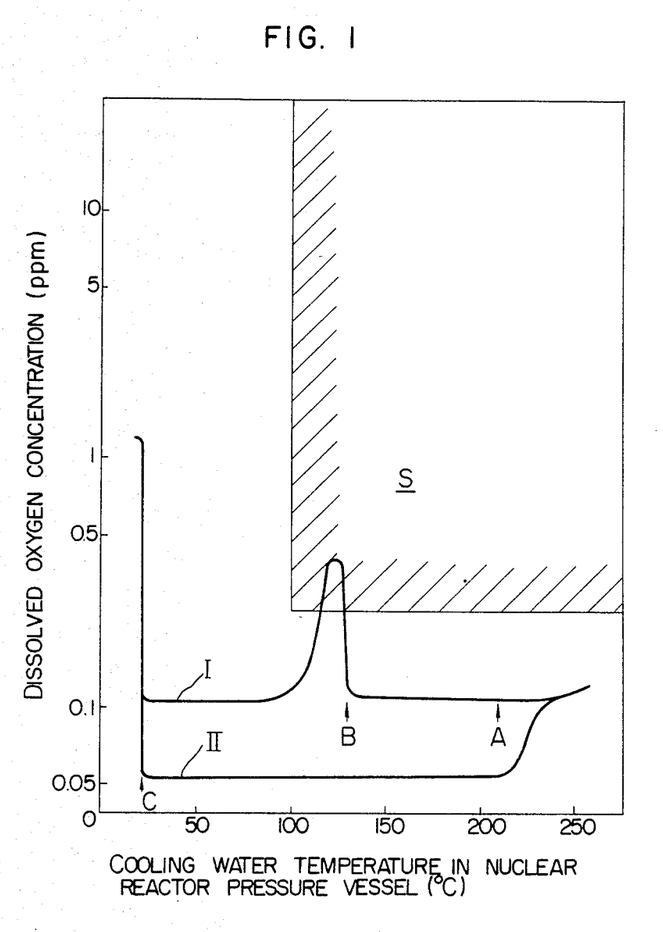
FIG. 1 is a characteristic diagram illustrating the change of dissolved oxygen concentration in the coolant in a nuclear reactor pressure vessel at the time of shutdown of the reactor.

Curve I in FIG. 1 shows the change of dissolved oxygen concentration in the coolant in the reactor pressure vessel at the time of shutdown of a conventional nuclear reactor described above. The dissolved oxygen concentration in the coolant stays constant at about 0.1 ppm independently of the drop of the coolant temperature, but when the residual heat removal system is operated (point B), that is, when the coolant temperature in the reactor pressure vessel reaches about 130° C., there takes place a sharp rise of the dissolved oxygen concentration in the coolant. However, when the coolant temperature drops to around 100° C., the dissolved oxygen concentration in the coolant in the pressure vessel again decreases to the constant level of around 0.1 ppm. The sharp rise of the dissolved oxygen concentration in the coolant as shown by the characteristic curve I is due to the operation of the residual heat removal system, because in the residual heat removal system, the high disolved oxygen concentration water remains inoperative at the time of start of the reactor or when the reactor is in normal rated output operation. Since the coolant is retained in said removal system during such period of operation, the dissolved oxygen concentration in the coolant increases gradually, and as the coolant with such high dissolved oxygen concentration in the residual heat removal system is supplied into the vessel at the time of shutdown of the reactor, there occurs a rise of the dissolved oxygen concentration in the coolant in the reactor pressure vessel. Point A in FIG. 1 indicates the time when insertion of the whole control rods is completed, and point C indicates the time when the head vent valve in the pressure vessel is opened. In case a welded structure of stainless steel is kept in contact for a prolonged period of time with the coolant having a dissolved oxygen concentration falling in the region S in FIG. 1 (stress corrosion cracking-sensitive region) where the temperature is about 100° C. or above and the dissolved oxygen concentration is in excess of about 0.2 ppm, the structure has a risk of suffering stress corrosion cracking.

Figure 2:
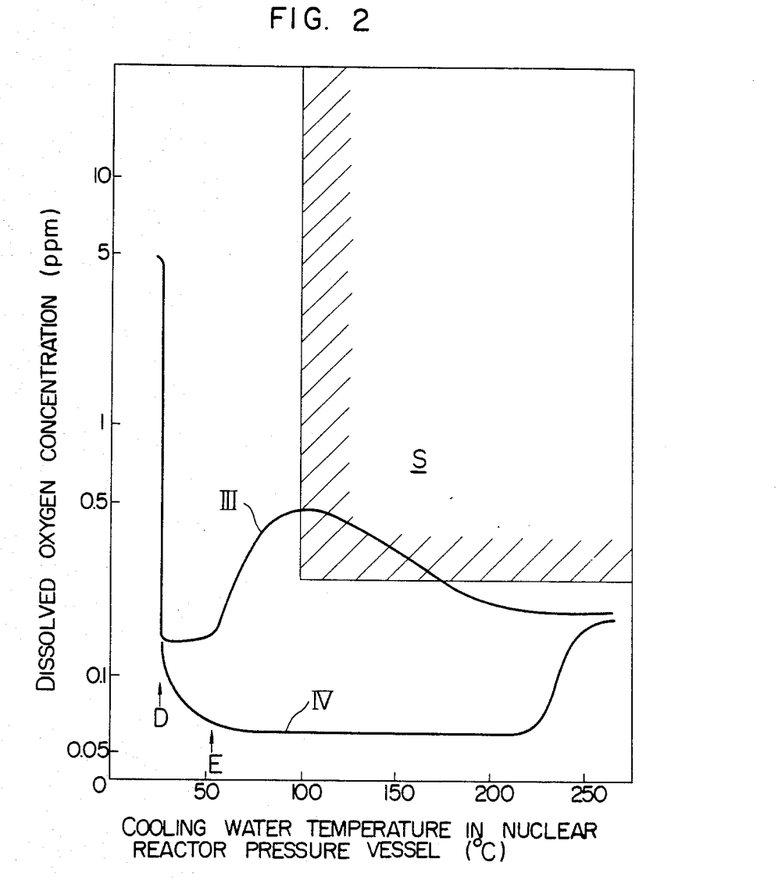
FIG. 2 is also a characteristic diagram showing the change of dissolved oxygen concentration in the coolant in a nuclear reactor pressure vessel at the time of start-up of the reactor.
Figure 4:
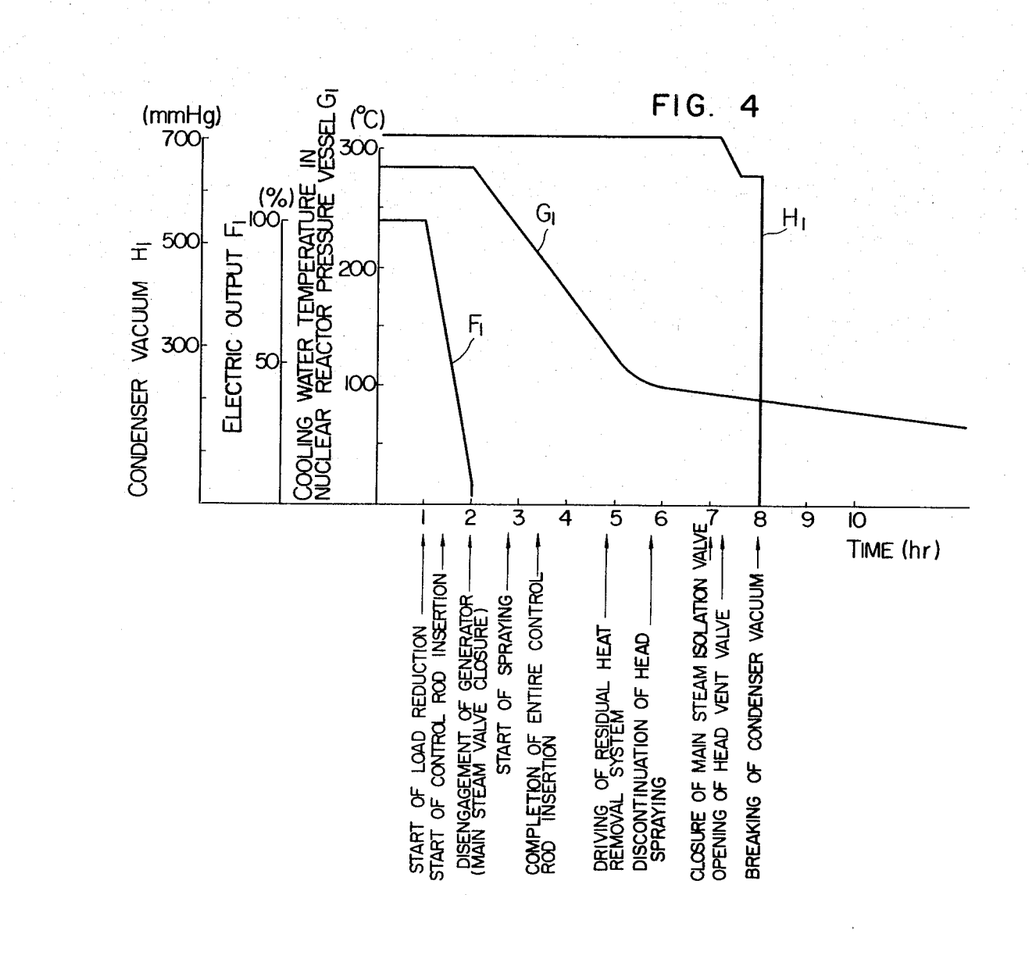
FIG. 4 is a characteristic diagram showing the changes of condenser vacuum, electrical output and coolant temperature at the time of shutdown of a nuclear reactor adapted with the system of FIG. 3.
Figure 5:
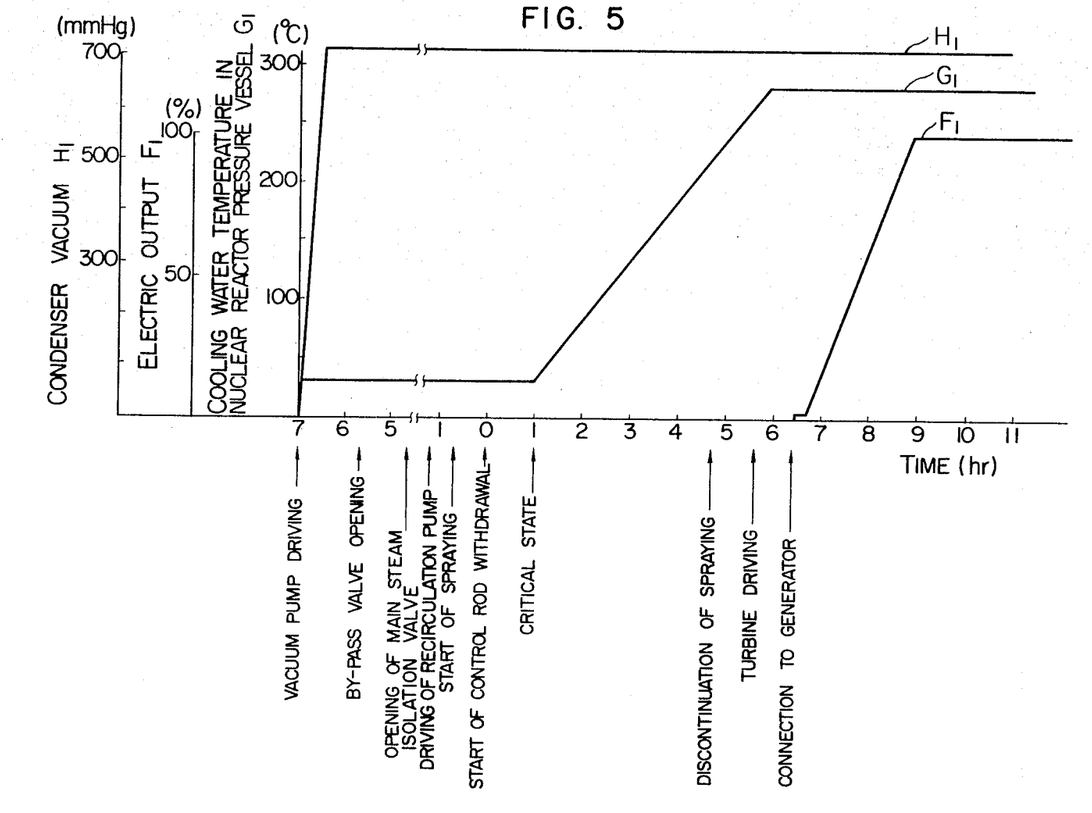
FIG. 5 is a characteristic diagram showing the changes of condenser vacuum, electrical output and coolant temperature at the start-up of the nuclear reactor adapted with the system of FIG. 3.

FIG. 2 shows the change of dissolved oxygen concentration in the coolant in a boiling water-type nuclear reactor pressure vessel at the time of start-up of the reactor. The conventional starting method is as illustrated in FIGS. 4 and 5 in U.S. Pat. No. 4,293,382. According to this method, first the condenser vacuum pump is operated to degas the nuclear reactor pressure vessel, and when the dissolved oxygen concentration in the coolant in the vessel drops below 0.2 ppm, the control rods are withdrawn from the core, and after a critical state is reached, nuclear heating is conducted. The change of dissolved oxygen concentration in the coolant in the nuclear reactor pressure vessel at the time of start-up according to such conventional method is shown by characteristic curve III in FIG. 2. A dissolved oxygen concentration in the stress corrosion cracking-sensitive region S is reached when the coolant temperature in the vessel is between 100° and 175° C. The rise of dissolved oxygen concentration in the coolant in the reactor vessel at the start-up of the reactor as shown by curve III is due to nuclear heating incidental to the control rod withdrawal. Point D in FIG. 2 indicates the time point at which the condenser vacuum pump is operated to start degassing, and point E indicates the time point when the control rods are withdrawn to initiate nuclear heating of the coolant after the boiling water-type nuclear reactor has reached a critical state.

As shown by curves I and III in FIGS. 1 and 2, at the time of shutdown and start-up of a boiling water type nuclear reactor in the conventional way, there exists a period in which the dissolved oxygen concentration in the coolant in the reactor pressure vessel stays in the region S. Actually, however, the period in which the dissolved oxygen concentration in the vessel stays in the region S is only about one hour at the time of shutdown and only about 2 hours even at the time of start-up and there is little risk of causing stress corrosion cracking. Even if there is little risk of occurence of stress corrosion cracking in the existing reactors, it is still necessary to make efforts for further reducing the possibility of such stress corrosion cracking to enhance the reliability of the boiling water type nuclear reactors.

The present invention has been attained on the basis of experimental results.

A preferred embodiment of this invention as adapted to a boiling water type nuclear reactor is described below with particular reference to FIG. 3.

When the reactor is in operation, the coolant in the reactor pressure vessel 1 is fed into the core 2 by driving a recirculation pump 4. The coolant turns into steam as it is heated while passing through the core 2. This steam is sent from the pressure vessel 1 into a turbine 7 through main steam piping 5. The main steam valve 6 is open. The steam discharged out from turbine 7 is condensed in a condenser 8 and then returns into the pressure vessel 1 through piping 12 for feed water-condensate water system which connects a condensation pump 13, a condensate demineralizer 14, a feed water heater 15 and a feed water pump 16 successively in that order as shown in the diagram.

The combustible gases such as oxygen and hydrogen generated by radioactive decomposition of the coolant in the pressure vessel 1 as well as the non-combustible gases such as radioactive rare gas carried in the steam are extracted from the condenser 8 by driving a vacuum pump 38 and led into a recombination device 39 and a rare gas hold-up device 40 through piping 42. Oxygen and hydrogen in the extracted gas are recombined by said recombination device 39 to become water. This water is removed by a condenser and a demineralizer, both being not shown in the drawing. Radioactivity of the radioactive rare gas is decayed by the rare gas hold-up device 40. The extracted gas with its radioactivity decayed is released out of the system from a vent stack 41.

While the reactor is in operation, the coolant in the vessel 1 is incessantly purified by a reactor water clean-up system. A part of the coolant flowing in the recirculation piping 3 is supplied into the reactor water clean-up system 19 with driving of a pump 18. This portion of coolant is cooled by a regenerative heat exchanger 22 and a non-regenerative heat exchanger 21 and forwarded into a demineralizer 22. The coolant purified by the demineralizer 22 is heated in a regenerative heat exchanger 20 by the coolant flowing into the demineralizer 22, then flows into the feed water system 12 and returns into the vessel 1.

A residual heat removal system is provided in the boiling water-type nuclear reactor. This residual heat removal system consists of a residual heat removal piping 23 which is connected at its both ends to the recirculation piping 3, a heat exchanger 24 and a pump 25. Said heat exchanger 24 and pump 25 are disposed in the residual heat removal piping 23. Also, valves 26 and 27 are provided at both ends of the residual heat removal piping 23. The piping 23 is connected by a pipe 28 to a spray nozzle 31 disposed inside the top of the reactor pressure vessel 1. At both ends of the pipe 28 are provided the valves 29 and 30. The pipe 28 is connected by a pipe 32 to that part of the reactor water clean-up piping 19 which is located on the discharge side of the demineralizer 22 and downstream of the regenerative heat exchanger 20. Valves 33 and 34 are provided at both ends of the pipe 32. When the reactor is operated under the normal rated output condition, the valves 10, 26, 27, 29, 30, 33, 34 and 43 stay closed.

The operation for shutdown of said boiling water type nuclear reactor is now described with reference to FIGS. 3 and 4. In FIG. 4, curve F1 indicates the electrical output, curve G1 the coolant temperature in the pressure vessel and curve H1 the condenser vacuum.

The speed of the recirculation pump 4 is reduced to decrease the coolant flow rate in the core 2 to lower the reactor output. As the reactor output begins to lower, the electric output is also reduced as shown by curve F1. When the reactor output drops to 60%, all of the control rods 35, including not only those inserted into the core 2 for output adjustment in operation of the reactor under normal rated output condition but also those completely withdrawn from the core 2 during reactor operation, start to be inserted into the core 2 by the operation of a control rod driving device 36. Upon sufficient lowering of the electric output, main steam valve 6 is closed while by-pass valve 10 is opened. The steam in the vessel 1 is released out and sent into condenser 8 through main steam piping 5 and by-pass piping 9 which connects said main steam piping 5 and condenser 8, whereby the steam feed into turbine 7 is discontinued, and at the same time the generator (not shown) which has been connected to turbine 7 is disengaged from said turbine 7. Turbine 7 is then tripped and entire control rod insertion into the core 2 is completed. As the steam in the vessel 1 is discharged into condenser 8 all the while, both pressure and coolant temperature in said vessel 1 drop sharply.

Valves 33 and 34 are opened before entire control rod insertion is completed. A part of the coolant circulating in the reactor water clean-up system 19 flows into piping 32 and sprayed from spray nozzle 31 into the space 44 above the coolant level 37 in the vessel 1. The coolant temperature in the vessel 1 at start of spray is about 240° C., and the coolant temperature at the outlet of the reactor water clean-up system is about 210° C. The coolant, thus sprayed, is formed into fine water droplets and increased in area contacted with the gas existing in the space 44. Consequently, oxygen and hydrogen generated by radioactive decomposition of the coolant in the core 2, etc., and dissolved in the coolant are separated into the space 44 which is communicated with the condenser 8 (main steam valve 6 closed and by-pass valve 10 open) of high degree of vacuum (vacuum pump 38 being driven). As the coolant sprayed from the spray nozzle 31 is formed into fine water droplets, the dissolved oxygen separating efficiency is enhanced. Oxygen and hydrogen separated from the water droplets are guided into the condenser 8 through main steam piping 5 and by-pass piping 9 and treated in the recombination device 14. The water droplets reduced in dissolved oxygen concentration fall down and mix in the coolant in the vessel 1. As a result of such continuous degassing by spray of the high-temperature coolant at the time of shutdown of the reactor, the dissolved oxygen concentration in the coolant in the vessel 1 sharply decreases from about 0.1 ppm prespray level down to about 0.05 ppm as shown by curve II in FIG. 1. The coolant with low dissolved oxygen concentration, which has been degassed in the vessel 1, incessantly circulates in the reactor water clean-up piping 32 throughout the period when the reactor is in operation. Even if such coolant in the piping 32 is sprayed into the space 44 and degassed, there does not result any increase of dissolved oxygen concentration in the coolant in the vessel 1.

Coolant spray through piping 32 is preferably performed before the residual heat removal system is put into operation whereupon the coolant with high dissolved oxygen concentration in said removal system is supplied into the vessel 1. However, if coolant spray into the space 44 is conducted before the main steam valve 6 is closed, since the water droplets are carried by the steam, there is a risk of corrosion of the main steam pipe 5 and turbine 7 by the water droplets. It is therefore desirable that the spray of the coolant into the space 44 through piping 32 be conducted after closure of the main steam valve 6 and before operation of the residual heat removal system.

When the pressure in the reactor pressure vessel 1 drops to 3 atm., that is, when the coolant temperature in the vessel 1 reaches about 130° C., the residual heat removal system is operated. Valves 26 and 27 are opened and the pump 25 is driven. A part of the coolant with low dissolved oxygen concentration circulating in the recirculation piping 3 flows into the residual heat removal system piping 23, and the coolant with high dissolved oxygen concentration, which has stayed in said piping 23, is guided into the vessel 1 through recirculation piping 3. However, since degassing by said spraying is performed continuously, the dissolved oxygen concentration in the vessel 1 is maintained at about 0.05 ppm as shown by curve II in FIG. 1. The residual heat removal system has a function to lower both pressure and coolant temperature in the vessel 1 as the coolant in the vessel 1 is cooled by the heat exchanger 24.

Valves 29 and 30 are opened upon passage of a predetermined period of time after start of the operation of the residual heat removal system. The low-temperature coolant cooled by the heat exchanger 24 (this portion of coolant being lower in temperature than the coolant flowing in the reactor water clean-up piping 19) passes through the piping 28 and is sprayed into the space 44 from the spray nozzle 31. The temperature of the coolant discharged out from the heat exchanger 24 of the residual heat removal system 23 is lower than the temperature of the coolant fed into the feed water-condensate water piping 12 from the reactor water clean-up piping 32. Valves 33 and 34 are closed with opening of the valves 29 and 30. The portion of the pressure vessel 1 located above the coolant surface 37 is usually the area of the poor cooling efficiency as this portion is not contacted with the coolant, but such portion can be cooled with high efficiency by injecting the coolant in the residual heat removal system from the spray nozzle 31. This allows prompt removal of the top cover of the vessel 1 for the purpose of maintenance and inspection such as fuel exchange. After head spraying for a predetermined period of time, valves 29 and 30 are closed. Thereafter, the main steam isolation valve (not shown) provided in that part of main steam piping 5 which penetrates the housing vessel encompassing the pressure vessel 1 is closed and the head vent valve 43 is opened. Then the vacuum pump 38 is stopped, allowing influx of air into the condenser 8 through a vacuum breaking valve to break up vacuum in the condenser 8. This air flows into the space 44 through by-pass piping 9 and piping 11. After the pressure in the space 44 is equalized to the atmospheric pressure, the top cover of the pressure vessel 1 is removed for said purposes.

The residual heat removal system keeps operating at the time of reactor shutdown and during the period of stoppage of the reactor and functions to remove heat generated in the core (including heat of decay of fuel generated after reactor shutdown).

In the instant embodiment, the dissolved oxygen concentration in the coolant in the nuclear reactor pressure vessel 1 lowers to a very low level, with no likelihood of falling in the region S, at the time of reactor shutdown, so that it is possible to perfectly exclude the risk of development of stress corrosion cracking in the pressure vessel 1 as well as the internal structures thereof.

Arrangement may be made such that the coolants flowing in both pipings 28 and 32 be sprayed simultaneously into the space 44 by keeping said both piping open. In this case, however, since the temperature of the coolant flowing in piping 32 is higher than that of the coolant flowing in piping 28, the pressure vessel cooling effect by spray of the coolant flowing in piping 28 is impaired. Also, the temperature of the water droplets formed after spraying of the coolant in piping 32 drops to supress the evaporation effect, resulting in a somewhat deteriorated degassing effect.

Both valves 29 and 30 need not be opened in case there is no need of removing the top cover of the pressure vessel 1 because of no need for maintenance and inspection (such as fuel exchange) for the vessel 1. In this case, therefore, there is no need of stopping spray of the coolant of piping 32 into the space 44 even after driving the residual heat removal system as in the foregoing embodiment.

An embodiment of this invention as applied at the time of start-up of a boiling water-type nuclear reactor is now explained with reference to FIGS. 3 and 5. Curves F1, G1 and H1 in FIG. 5 correspond to those in FIG. 4. After completion of the maintenance and/or inspection work such as fuel exchange, the top cover is remounted on the vessel 1. Then the vacuum breaking valve (not shown) of the condenser 8 is closed and the vacuum pump 38 is operated to elevate the vacuum in the condenser 8. The main steam isolation valve in main steam pipe 5, main steam valve 6, by-pass valve 10 and head vent valve 43 stay closed. Valves 26, 27, 29, 30, 33 and 34 also remain closed. When the vacuum in the condenser 8 has reached a predetermined level, by-pass valve 10 is opened, followed by opening of the main steam isolation valve. As the vacuum in the pressure vessel 1 rises accordingly, the dissolved oxygen concentration in the coolant in said vessel 1 drops sharply as shown in FIG. 2. Then recirculation pump 4 is driven to increase the coolant flow rate in the core to 20%. Pump 18 is also driven to start clean-up of the coolant in the vessel 1 by demineralizer 22. Valves 33 and 34 are opened, allowing the coolant in the reactor water clean-up system piping 19 to pass through piping 32 and be sprayed into the space 44 from spray nozzle 31. Dissolved oxygen in the fine water droplets sprayed into the space 44 is separated as in the case of the operation at the time of reactor shutdown.

Then withdrawal of the control rods 35 inserted in the core 2 is started. A predetermined amount of control rod withdrawal is effected gradually until a critical state is reached. Thereafter the control rods 35 are further withdrawn and heating of the coolant (nuclear heating) by nuclear fission of fuel is started, causing a pressure boost in the vessel 1 and heating of the coolant. When the reactor output elevates to 60%, control rod withdrawal is stopped to increase the coolant flow rate in the core 2. This further elevates the reactor output. The temperature of the coolant sprayed from spray nozzle 31 is naturally higher than the temperature of the coolant which has been cooled by heat exchanger 24, not only during the period when nuclear heating is being performed by control rod withdrawal but also even at the time of start of spraying. When the coolant temperature reaches about 220° C., both valves 33 and 34 are closed to stop spraying of the coolant in piping 32 into the space 44. Spraying may be continued until main steam valve 6 is opened as discussed below. If spraying is further continued even after opening of main steam valve 6, water droplets will be led into turbine 7. The dissolved oxygen concentration in the coolant in the vessel 1 can be maintained to a very low level, or at about 0.06 ppm, as shown by curve IV in FIG. 2 by performing the spraying of the coolant into the space 44 through piping 32. No increase of dissolved oxygen concentration in the coolant is caused even if oxygen generation by radioactive decomposition of the coolant by nuclear heating thereof is increased, and there can be eliminated any risk of stress corrosion cracking of the reactor vessel 1 and its internal structures even at the time of sarting of operation. It may be envisaged to spray the coolant in the residual heat removal system into space 44 through piping 28 and spray nozzle 31, instead of spraying the coolant in reactor water clean-up system piping 19 into said space 44 through piping 32. However, it should be noted that while coolant spraying at the time of start of operation is performed for suppressing increase of dissolved oxygen concentration consequent upon increase of oxygen generation by nuclear heating, it is also required to avoid any hindrance to rise of pressure and temperature of the reactor. For example, even if the residual heat removal system is operated at the time of shutdown of the reactor, spraying of the cooled coolant in such system produces a cooling action to impede rise of pressure and temperature of the reactor.

When the coolant temperature in the vessel 1 reaches about 280° C., with the internal pressure thereof also reaching about 70 atm., by-pass valve 10 is closed and at the same time main steam valve 5 is opened. The steam generated in the vessel 1 is sent into turbine 7 through main steam piping 5 to actuate the turbine 7, and this turbine 7 is then connected to the generator.

Figure 6:
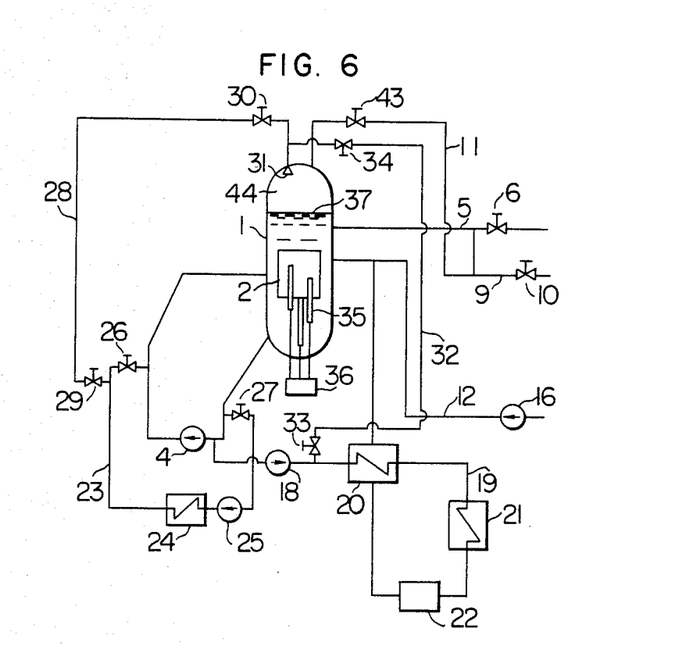
FIGS. 6 to 9 are the block diagrams of the degassing systems according to other embodiments of this invention.

Still another embodiment of this invention is shown in FIG. 6, wherein the same means and members in the foregoing embodiment are indicated by the same symbols. In this embodiment, piping 32 which is connected at its one end to piping 28 has its other end connected to that part of reactor water clean-up system piping 19 which is located between pump 18 and regenerative heat exchanger 20. The arrangement of this embodiment, as in the foregoing embodiment, is capable of preventing stress corrosion cracking at least at the time of shutdown or at the time of start-up of the reactor. This embodiment, however, is rather low in coolant purification efficiency as the coolant which by-passed the demineralizer 22 returns to the vessel 1.

Figure 3:
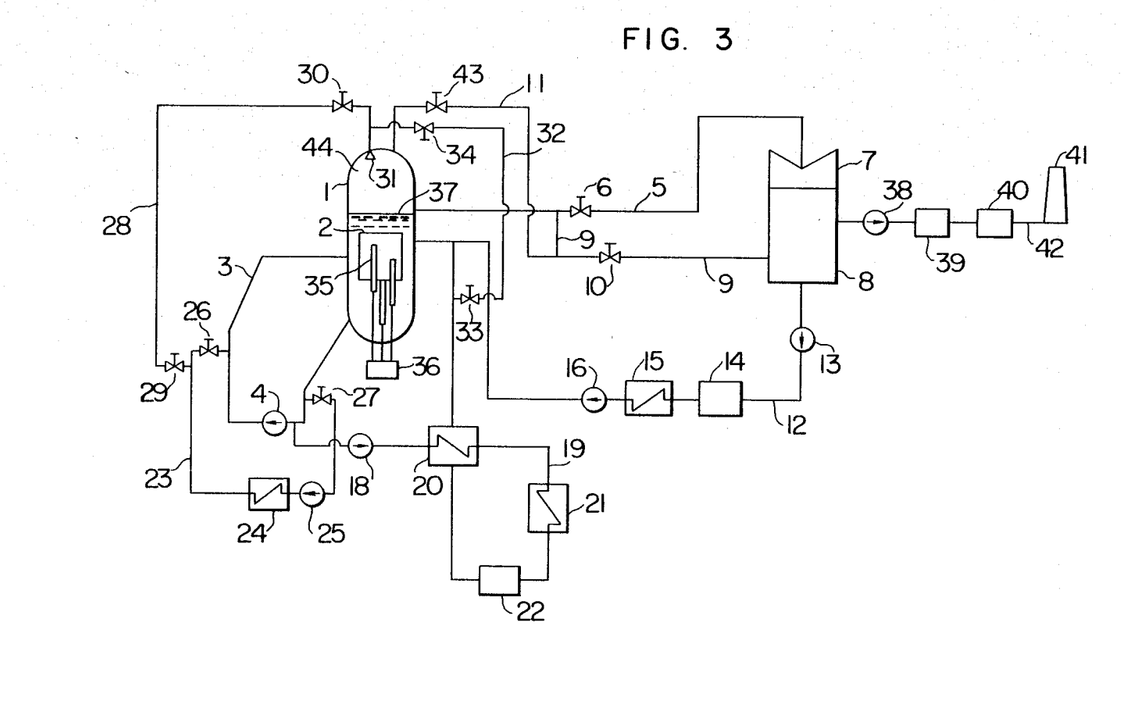
FIG. 3 is a block diagram of a nuclear reactor degassing system in accordance with a preferred embodiment of this invention.
Figure 7:
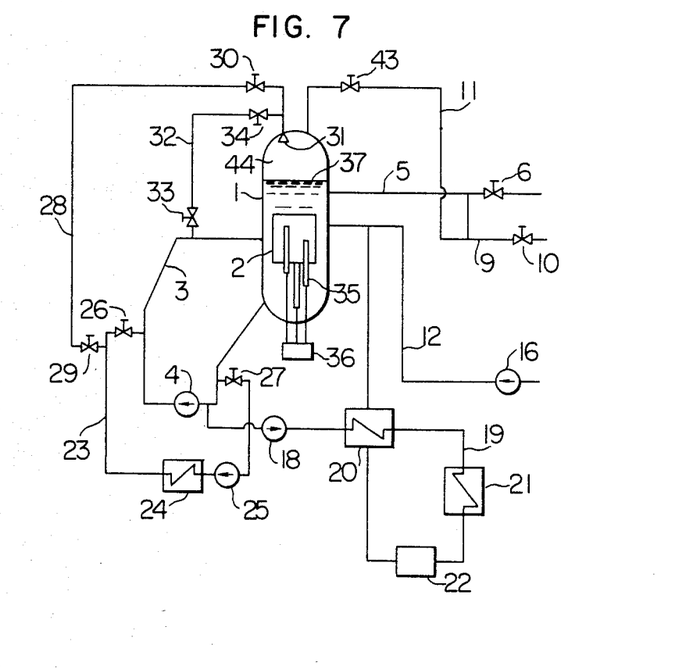

A further embodiment of this invention is illustrated in FIG. 7, with the same means and members as in the embodiment of FIG. 3 being indicated by the same symbols. In this embodiment, an end of piping 32 is connected to recirculation piping 3 in which the degassed coolant flows all the time. The same effect as in the embodiment of FIG. 3 is provided from the instant embodiment in which the coolant is sprayed into the space 44 at least at the time of shutdown or at the time of start-up of the reactor.

Figure 8:
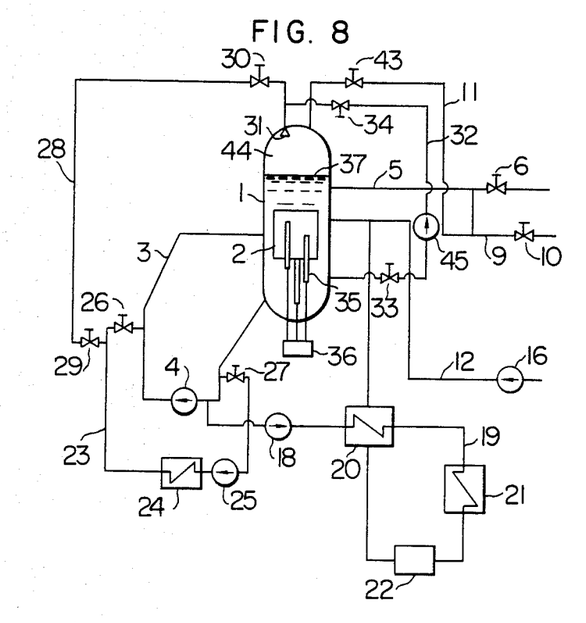

Still another embodiment of this invention is depicted in FIG. 8 where the same members as in the embodiment of FIG. 3 are referred to by the same symbols. In this embodiment, an end of piping 32 is connected directly to the reactor pressure vessel 1 and a pump 45 is provided in piping 32. When the coolant is sprayed into the space 44 at least at the time of shutdown or at the time of start-up of the reactor, valves 33 and 34 are opened and pump 45 is driven. This embodiment can produce the same effect as in the embodiment of FIG. 3. However, increase of piping connected to the pressure vessel 1 is a detrimental factor for the fabrication of the system. Also, this embodiment requires provision of an additional pump 45.

Figure 9:
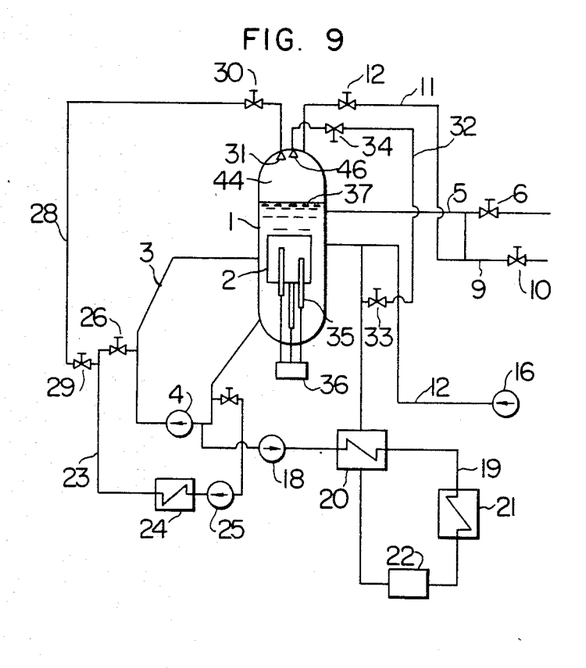

In yet another embodiment of this invention shown in FIG. 9, spray nozzles 31 and 46, both disposed in space 44, are provided respectively to pipings 28 and 32. This embodiment can give the same effect as in the embodiment of FIG. 3.

In any of the embodiments of FIGS. 6 to 9, the temperature of the coolant flowing in piping 32 is higher than that of the coolant flowing in piping 28.

This invention can be applied to other types of nuclear reactors such as pressurized water type nuclear reactor.

According to this invention, it is possible to perfectly prevent stress corrosion cracking in the nuclear reactor vessels and the internal structures thereof either at the time of shutdown or at the time of start-up of the reactors to further enhance the reliability of the reactors.

We claim:

1. A system for degassing a nuclear reactor comprising a nuclear reactor vessel containing a coolant with a concentration of gas therein, the coolant being in a hot temperature state during operation of the nuclear reactor, means for recirculating the coolant in the reactor vessel, means for extracting at least part of the coolant in the recirculating means, means for spraying the extracted coolant during shutdown when the coolant temperature is in at least a range between 130° C. and 100° C. into a space of the nuclear reactor vessel for separating the gas from the coolant, and means for extracting the gas in the space of the nuclear reactor vessel so as to degasify the nuclear reactor vessel for preventing stress corrosion cracking of the nuclear reactor vessel and associated equipment.

2. A system according to claim 1, wherein the nuclear reactor is a boiling water reactor and the space of the nuclear reactor vessel is at an upper portion of the vessel, the coolant contained in the vessel being provided below the space, and means for shutting down the reactor including control rods for being fully inserted into a core of the reactor for shutdown thereof.

3. A system according to claim 15, wherein the nuclear reactor further comprising residual heat removal means connected to the recirculating means, the residual heat removal means including piping containing coolant with a high concentration of gas therein, means for operating the residual heat removal means after completion of insertion of the control rods into the core of the reactor, and means for supplying the coolant in the piping of the residual heat removal means to the spraying means for spraying the coolant into the space of the nuclear reactor vessel for separating the gas from the coolant.

4. A method for degassing a nuclear reactor including a nuclear vessel containing a coolant with a concentration of gas therein, the coolant being in a hot temperature state during operation of the nuclear reactor, the method comprising, during shutdown of the nuclear reactor, the steps of extracting at least part of the coolant having the gas concentration therein from the nuclear reactor vessel, spraying the extracted coolant while in the hot temperature state of at least a range between 130° C. and 100° C. into a space of the nuclear reactor vessel for separating the gas from the coolant, and extracting the gas in the space of the nuclear reactor vessel so as to degasify the nuclear reactor vessel for preventing stress corrosion cracking of the nuclear reactor vessel and associated equipment.

5. A method according to claim 4, wherein the nuclear reactor includes a coolant recirculation system, and the step of extracting at least part of the coolant includes extracting at least a part of the coolant from the coolant recirculation system.

6. A method according to claim 4, wherein the nuclear reactor includes a residual heat removal system connected to the nuclear reactor vessel and containing coolant with a high concentration of gas in a piping of the residual heat removal system, the method further comprising during shutdown, the steps of subsequently operating the residual heat removal system, and the step of spraying including spraying the coolant contained in the piping of the residual heat removal system into the space of the nuclear reactor vessel for separating the gas from the coolant, and extracting the gas from the space.

7. A method according to claim 6, wherein the nuclear reactor generates steam within the nuclear reactor vessel and the steam is supplied to a load, the method further comprising during shutdown, the steps of discontinuing the supply of steam to the load and the step of spraying includes subsequently spraying the coolant in the hot temperature state into the space of the nuclear reactor vessel.

8. A method according to claim 6, wherein the gas contained in the coolant includes oxygen.

9. A method according to claim 6, wherein the nuclear reactor is a boiling water reactor and the space of the nuclear reactor vessel is at an upper portion of the vessel, the coolant contained in the vessel being provided below the space, the shutdown of the reactor including the steps of fully inserting control rods withdrawn from a core of the reactor during operation of the reactor into the core of the reactor for shutdown thereof.

10. A method for degassing a nuclear reactor including a nuclear reactor vessel containing a coolant having a concentration of gas, the vessel having a space in which vapors are generated during operation of the nuclear reactor for being supplied to a load, the method comprising, during start-up of the nuclear reactor, the steps of extracting gas from the space in the nuclear reactor vessel, extracting at least part of the coolant from the nuclear reactor vessel, spraying the extracted coolant having a temperature during start-up of at least in a range between 100° C. and 175° C. into the space of the nuclear reactor vessel for separating gas from the coolant while extracting gas from the space, discontinuing the spraying of the coolant into the space prior to vapors in the space being supplied to the load, and elevating an output of the nuclear reactor to a predetermined level.

11. A method according to claim 10, wherein the nuclear reactor includes a coolant recirculation system, and the step of extracting at least part of the coolant, includes extracting at least a part of the coolant from the coolant recirculation system during start-up of the nuclear reactor.

12. A method according to claim 11, wherein the gas contained in the coolant includes oxygen.

13. A method according to claim 11, wherein the nuclear reactor is a boiling water reactor and the space of the nuclear reactor vessel is at an upper portion of the vessel, the coolant contained in the vessel being provided below the space, the vapors within the space being steam generated during operation of the reactor, and the load including a turbine for driving a generator.

14. A system for degassing a nuclear reactor comprising a nuclear reactor vessel containing a coolant with a concentration of gas therein, the coolant being in a hot temperature state during operation of the nuclear reactor, means for recirculating the coolant in the reactor vessel, means for extracting at least part of the coolant in the recirculating means, means for spraying the extracted coolant during start-up when the coolant temperature is at least in a range between 100° C. and 175° C. into a space of the nuclear reactor vessel for separating the gas from the coolant, and means for extracting the gas in the space of the nuclear reactor vessel so as to degasify the nuclear reactor vessel for preventing stress corrosion cracking of the nuclear reactor vessel and associated equipment.

15. A system according to claim 14, wherein the nuclear reactor is a boiling water reactor and the space of the nuclear reactor vessel is at an upper portion of the vessel, the coolant contained in the vessel being provided below the space, and means for shutting down the reactor including control rods for being fully inserted into a core of the reactor for shutdown thereof.

16. A system according to claim 15, wherein the nuclear reactor further comprises residual heat removal means connected to the recirculating means, the residual heat removal means including piping contaning coolant with a high concentration of gas therein, means for operating the residual heat removal means after completion of insertion of the control rods into the core of the reactor, and means for supplying the coolant in the piping of the residual heat removal means to the spraying means for spraying the coolant into the space of the nuclear reactor vessel for separating the gas from the coolant.

* * * * *